(12) United States Patent
Brobston et al.

(10) Patent No.: US 9,144,012 B2
(45) Date of Patent: Sep. 22, 2015

(54) METHOD AND SYSTEM OF MIMO AND BEAMFORMING TRANSMITTER AND RECEIVER ARCHITECTURE

(75) Inventors: Michael Lee Brobston, Allen, TX (US); Breck Wayne Lovinggood, Garland, TX (US); Vinh Huy Bui, Garland, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1221 days.

(21) Appl. No.: 12/889,195

(22) Filed: Sep. 23, 2010

(65) Prior Publication Data

US 2012/0076229 A1 Mar. 29, 2012

(51) Int. Cl.
*H04L 27/00* (2006.01)
*H04W 52/02* (2009.01)
*H04B 7/04* (2006.01)

(52) U.S. Cl.
CPC ......... *H04W 52/0206* (2013.01); *H04B 7/0413* (2013.01)

(58) Field of Classification Search
CPC ........ H04B 7/0413; H04B 1/26; H04B 1/408; H04B 1/0413; H04B 7/04; H04L 2027/0016; H04L 27/00; H04L 2027/0026; H03L 2207/06; H04W 52/0206
USPC ......... 375/299, 267, 376, 316, 260, 327, 347, 375/349, 377; 455/101, 103, 323, 180.3, 455/293, 324, 334, 84, 132, 146, 147, 455/196.1, 207, 208, 209, 255, 258–260, 455/265, 311, 316
See application file for complete search history.

(56) References Cited

U.S. PATENT DOCUMENTS

| | | | |
|---|---|---|---|
| 4,216,428 A | 8/1980 | Tatsuzawa et al. | |
| 4,715,048 A * | 12/1987 | Masamura | 375/347 |
| 6,728,517 B2 * | 4/2004 | Sugar et al. | 455/73 |
| 6,925,294 B2 * | 8/2005 | Ohtaki | 455/323 |
| 7,573,398 B2 * | 8/2009 | Hoctor et al. | 340/870.12 |
| 2003/0007450 A1 * | 1/2003 | Ohtaki | 370/208 |
| 2006/0089115 A1 * | 4/2006 | Goodman | 455/189.1 |
| 2007/0021081 A1 | 1/2007 | Passoke | |
| 2010/0091688 A1 | 4/2010 | Staszewski et al. | |
| 2010/0172395 A1 * | 7/2010 | Sambhwani et al. | 375/146 |
| 2010/0290563 A1 * | 11/2010 | Rofougaran | 375/300 |
| 2011/0019723 A1 * | 1/2011 | Lerner et al. | 375/219 |
| 2012/0069876 A1 * | 3/2012 | Kamizuma et al. | 375/219 |

FOREIGN PATENT DOCUMENTS

| | | |
|---|---|---|
| EP | 0936754 A2 | 8/1999 |
| EP | 1318641 A2 | 6/2003 |
| EP | 1764926 A2 | 3/2007 |
| WO | WO 2010/121183 A1 | 10/2010 |

OTHER PUBLICATIONS

Extended Search Report dated Jul. 18, 2012 in connection with European Application No. 11182127.8.

* cited by examiner

*Primary Examiner* — Rahel Guarino

(57) ABSTRACT

A multiple-input multiple-output (MIMO) receiver includes a receive path circuitry configured to receive a first signal from a first antenna and a second signal from a second antenna, downconvert the first signal to a first frequency to generate a first intermediate frequency (IF) signal, downconvert the second signal to a second frequency different from the first frequency to generate a second IF signal, and combine the first IF signal and the second IF signal into a common signal.

20 Claims, 13 Drawing Sheets

METHOD AND SYSTEM OF MIMO AND BEAMFORMING TRANSMITTER AND RECEIVER ARCHITECTURE

TECHNICAL FIELD OF THE INVENTION

The present application relates generally to wireless communications and, more specifically, to a method and system for multiple-input multiple-output (MIMO) transmission.

BACKGROUND OF THE INVENTION

In modern digital communications systems, advanced transmission techniques are being implemented to increase link capacity and spectral efficiency. Many of these methods utilize multiple antennas to transmit and receive signals. Examples of multi-antenna systems included beamforming, MIMO, and Spatial Division Multiplexing (SDMA). As an example, in the 3$^{rd}$ Generation Partnership Project Long Term Evolution (3GPP LTE), Orthogonal Frequency Division Multiplexing (OFDM) is adopted as a downlink (DL) transmission scheme, and all of the referenced multi-antenna methods are potentially utilized.

SUMMARY OF THE INVENTION

A multiple-input multiple-output (MIMO) receiver is provided. The MIMO receiver comprises a receive path circuitry configured to receive a first signal from a first antenna and a second signal from a second antenna, downconvert the first signal to a first frequency to generate a first intermediate frequency (IF) signal, downconvert the second signal to a second frequency different from the first frequency to generate a second IF signal, and combine the first IF signal and the second IF signal into a common signal.

A method of operating a multiple-input multiple-output (MIMO) receiver is provided. The method comprises receiving a first signal from a first antenna and a second signal from a second antenna, downconverting the first signal to a first frequency to generate a first intermediate frequency (IF) signal, downconverting the second signal to a second frequency different from the first frequency to generate a second IF signal, and combining the first IF signal and the second IF signal into a common signal.

A multiple-input multiple-output (MIMO) transmitter is provided. The MIMO transmitter comprises a transmit path circuitry configured to generate a first baseband signal and a second baseband signal, generate a first intermediate frequency (IF) signal by upconverting the first baseband signal to a first intermediate frequency, and generate a second IF signal by upconverting the second baseband signal to a second intermediate frequency different from first intermediate frequency. The transmit path circuitry is further configured to upconvert the first IF signal using a first oscillator tone at a first oscillator frequency, upconvert the second IF signal using a second oscillator tone at a second oscillator frequency different from the first oscillator frequency, and combine the upconverted first IF signal and the upconverted second IF signal into a single complex digital signal.

A method of operating a multiple-input multiple-output (MIMO) transmitter is provided. The method comprises generating a first baseband signal and a second baseband signal, generating a first intermediate frequency (IF) signal by upconverting the first baseband signal to a first intermediate frequency, and generating a second IF signal by upconverting the second baseband signal to a second intermediate frequency different from first intermediate frequency. The method further comprises upconverting the first IF signal using a first oscillator tone at a first oscillator frequency, upconverting the second IF signal using a second oscillator tone at a second oscillator frequency different from the first oscillator frequency, and combining the upconverted first IF signal and the upconverted second IF signal into a single complex digital signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts. For ease and clarity in the description of the embodiments of this disclosure, an OFDM transmitter and receiver are described. However, those skilled in the art would recognize that this invention is not limited to an OFDM application and may be applicable to any number of multi-antenna communications systems without departing from the scope or spirit of this disclosure.

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
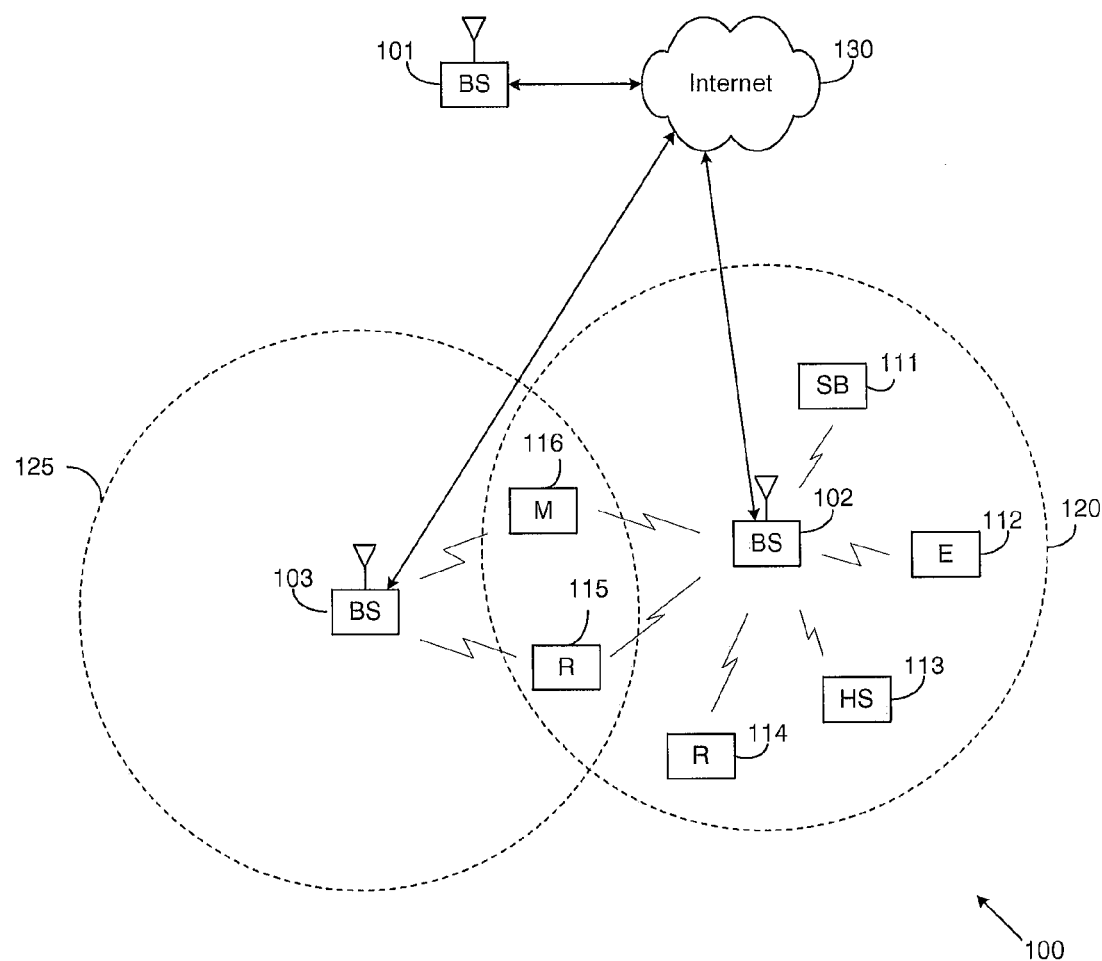
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 maybe, for example, a wireless-enabled personal computer (PC), a laptop computer, a gateway, or another device.

Figure 2:
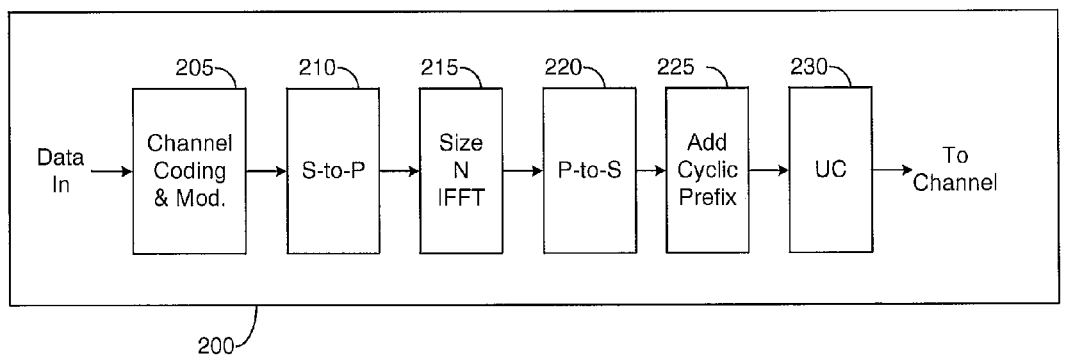
FIG. 2 is a high-level diagram of an orthogonal frequency division multiple access (OFDMA) transmitter according to one embodiment of this disclosure.
Figure 3:
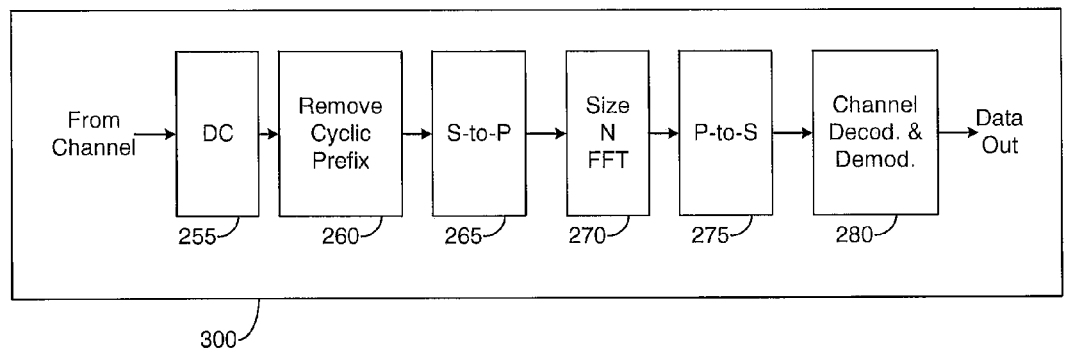
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to radio frequency (RF) for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Figure 4:
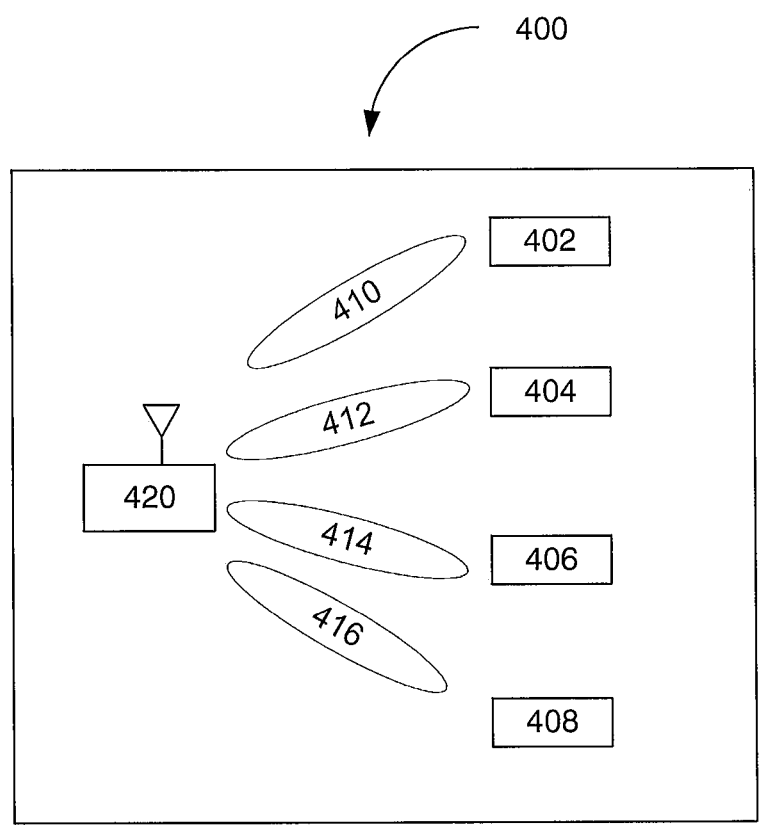
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
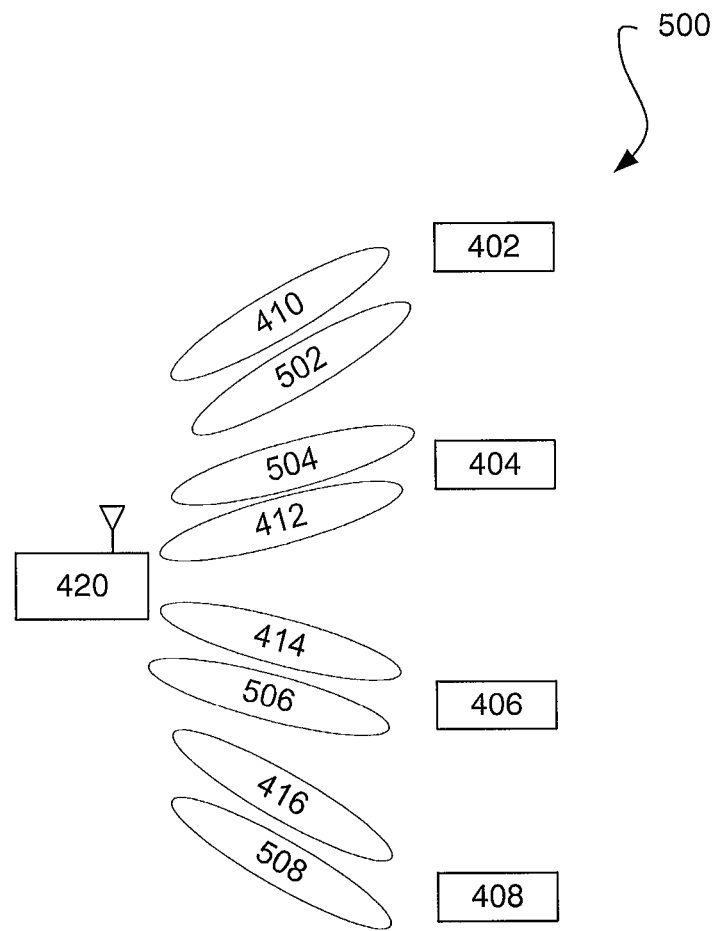
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

MIMO systems have been widely considered a viable solution to overcome the current limitations of wireless communication systems. The conventional MIMO receiver architecture consists of replicated RF antenna branches, each containing a pre-select bandpass filter, low noise amplifier (LNA), automatic gain control (AGC), mixers and analog-to-digital converters (ADCs) (one for each quadrature component).

On the infrastructure side, initial MIMO implementations have been relatively simple with only a 2×2 MIMO structure supported. However, newer standards such as LTE are planning more complex implementations such as 4×2 or 4×4 MIMO while emerging standards such as 802.16m/LTE-ADV are considering even more complex MIMO structures (8×8) to enable higher spectrum efficiency. While the push for higher level MIMO structures is warranted by the need for spectrum efficiency, the physical RF hardware implementation problems of these high level MIMO structures has to date been generally ignored.

The challenges encountered using MIMO techniques include a significant increase in the area, cost, and power consumption of the receiver and transmitter. The greatest technical problem may be the size, cost and power consumption caused by the complexity of the algorithms required for handling the transmitted and received data over the multiple paths. Such systems require multiple RF front ends and analog-to-digital converters (ADCs), which are a burden for mobile terminals in terms of power consumption, hardware cost, and physical size.

In a conventional MIMO transceiver, a separate RF chain is implemented for each MIMO stream or path. While relatively simple for simple MIMO structures such as 2×2, the complexity of this approach grows very quickly as the number of orthogonal paths for the MIMO transceiver increases. For example, a 4×4 implementation can quickly result in a very complex printed circuit board assembly (PBA) requiring 18+ layers and literally thousands of components for a single transceiver. The hardware design is complicated by the need to achieve very high channel to channel isolation on the PBA along with requiring close attention to spurious and normally simple requirements such as clock distribution. When considering the requirements for reaching an 8×8 configuration, the hardware complexity almost grows beyond realistic single board implementation.

In order to enable a wider adoption of MIMO architectures and make MIMO architectures cost effective for pico-cell and femto-cell platforms, this disclosure provides more efficient architectures for MIMO detection that could lead to reductions in the receiver and transmitter complexity. In particular, this disclosure describes systems and methods of combining multiple receiver channels or transmitter channels through common signal processing paths while maintaining both isolation and independence of the signals from each of the antennas.

Figure 6:
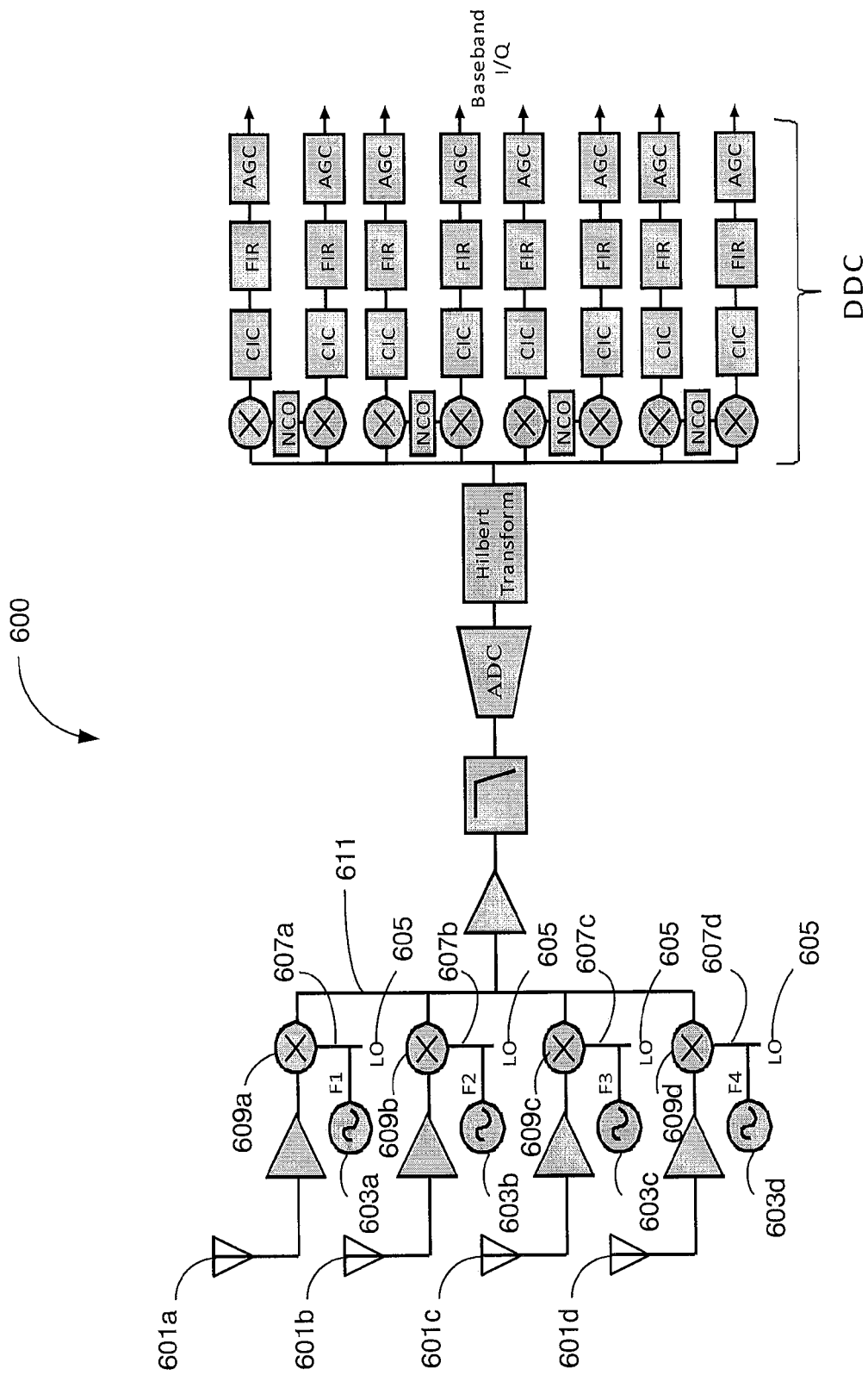
FIG. 6 illustrates a MIMO receiver architecture according to an embodiment of this disclosure.

FIG. 6 illustrates a MIMO receiver architecture 600 according to an embodiment of this disclosure.

In one embodiment of this disclosure, a different offset frequency is mixed into each of the four MIMO receiving channels in order to offset their intermediate frequencies (IF). The IF signals are then combined in a common IF path, and the IF processing and analog-to-digital conversion is then accomplished within a single device. The individual channels are separated in the digital domain by a multi-channel digital down converter block that maintains the orthogonal nature of the streams.

As shown in FIG. 6, the MIMO receiver architecture 600 includes a plurality of antennas 601a, 601b, 601c, and 601d. Four unique offset frequencies 603a, 603b, 603c, and 603d are mixed with a common local oscillator frequency 605 to generate four unique local oscillator frequencies 607a, 607b, 607c, and 607d, respectively. The four unique local oscillator frequencies 607a, 607b, 607c, and 607d are then combined with the signals from the antennas 601a, 601b, 601c, and 601d, respectively, at mixers 609a, 609b, 609c, and 609d, respectively. The resulting IF signals are then combined in a common IF path 611. IF processing and analog-to-digital conversion are then accomplished within a single device.

The MIMO receiver architecture 600 of FIG. 6 provides the advantage of not requiring significant interaction with the baseband processing typically done in the modem. The MIMO receiver architecture 600 provides an all RF/IF solution that can be adapted to multiple products.

This embodiment uses multiple offset frequencies that are mixed with a common local oscillator frequency to generate the four unique local oscillator frequencies used for downconverting the signals.

Figure 7:
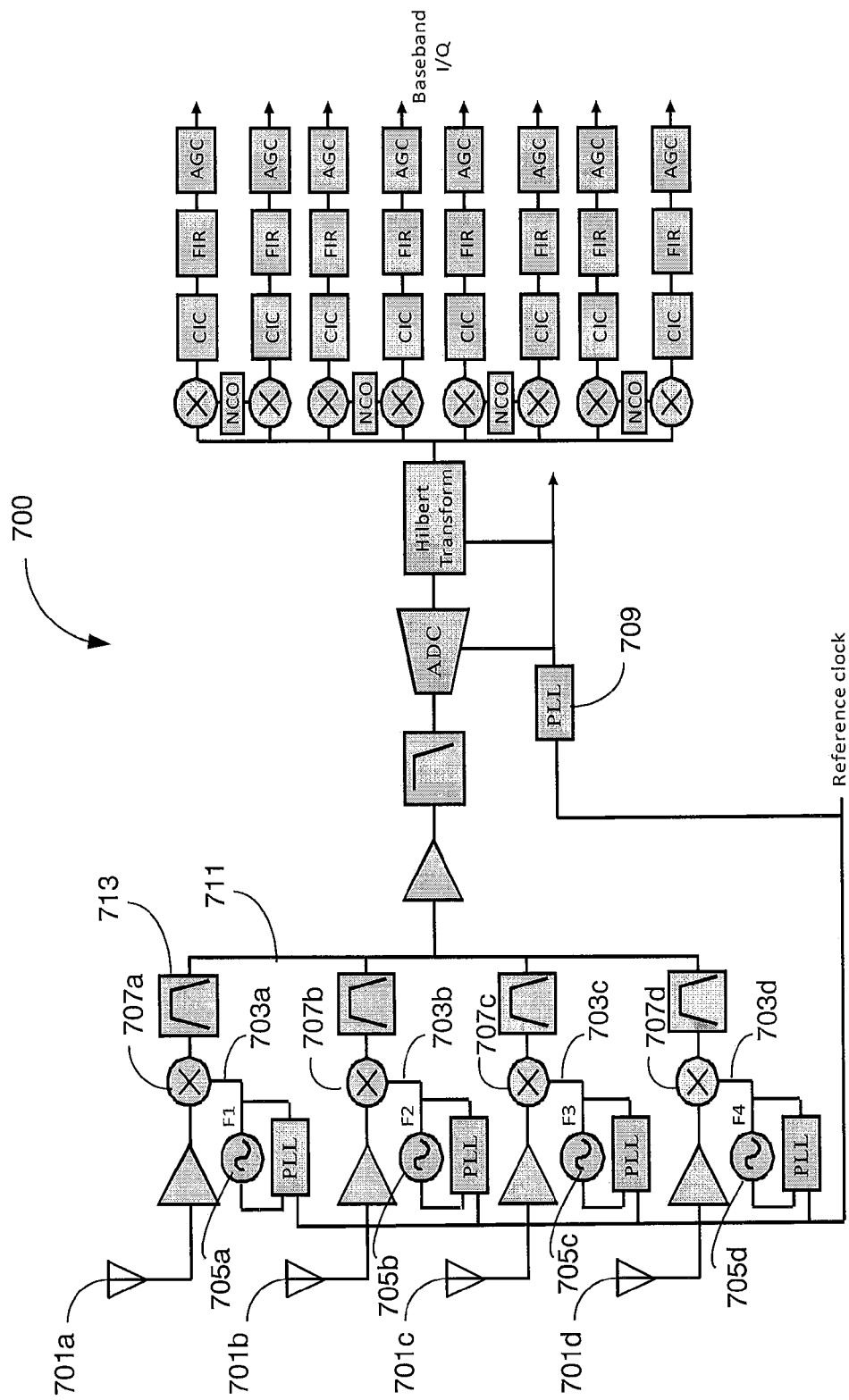
FIG. 7 illustrates a MIMO receiver architecture according to another embodiment of this disclosure.

FIG. 7 illustrates a MIMO receiver architecture 700 according to another embodiment of this disclosure.

In this embodiment, separate local oscillators are used to generate mixing tones directly at the desired local oscillator frequencies. Each of the oscillator signals is phase locked to a reference tone to maintain coherency and phase relationships between the antenna signals.

As shown in FIG. 7, the MIMO receiver architecture 700 includes a plurality of antennas 701a, 701b, 701c, and 701d. Four unique local oscillator frequencies 703a, 703b, 703c, and 703d are generated at four separate local oscillators 705a, 705b, 705c, and 705d, respectively. The four unique local oscillator frequencies 703a, 703b, 703c, and 703d are then combined with the signals from the antennas 701a, 701b, 701c, and 701d, respectively, at mixers 707a, 707b, 707c, and 707d, respectively. The resulting IF signals are then combined in a common IF path 711. IF processing and analog-to-digital conversion are then accomplished within a single device.

In this embodiment, each of the local oscillators 705a, 705b, 705c, and 705d signals is phase locked to a reference tone 709 to maintain coherency and phase relationships between the antenna signals.

In the embodiment of FIG. 7, the signals received from each of the four antenna are downconverted to a different IF frequency using four different local oscillator frequencies. In a particular example, the four IF frequencies are 153.6, 174.08, 194.56, and 215.04 MHz, although one of ordinary skill in the art would recognize that any combination of IF frequencies may be used. In this embodiment, each of the signals are passed through a band-pass filter 713 to limit adjacent channel power before the four channels are combined into a common signal at the common IF path 711. In a particular example, the combined IF signal is sampled at 245.76 Msps by the analog-to-digital converter 713. Of course, one of ordinary skill in the art would recognize that other sampling rates may be used. Sampling at this rate produces images at the respective frequencies of 92.16, 71.68, 51.20, and 30.72 MHz in the first Nyquist zone from the analog-to-digital converter 715.

The resulting digital signal is further processed to separate the signals for each antenna and create complex baseband versions of the signal from each antenna. In a particular example, the complex digital carriers are downconverted as a block by a Hilbert Transform function unit 717 by 61.44 MHz to produce complex digital carriers at −30.72, −10.24, +10.24, and +30.72 MHz.

Figure 8:
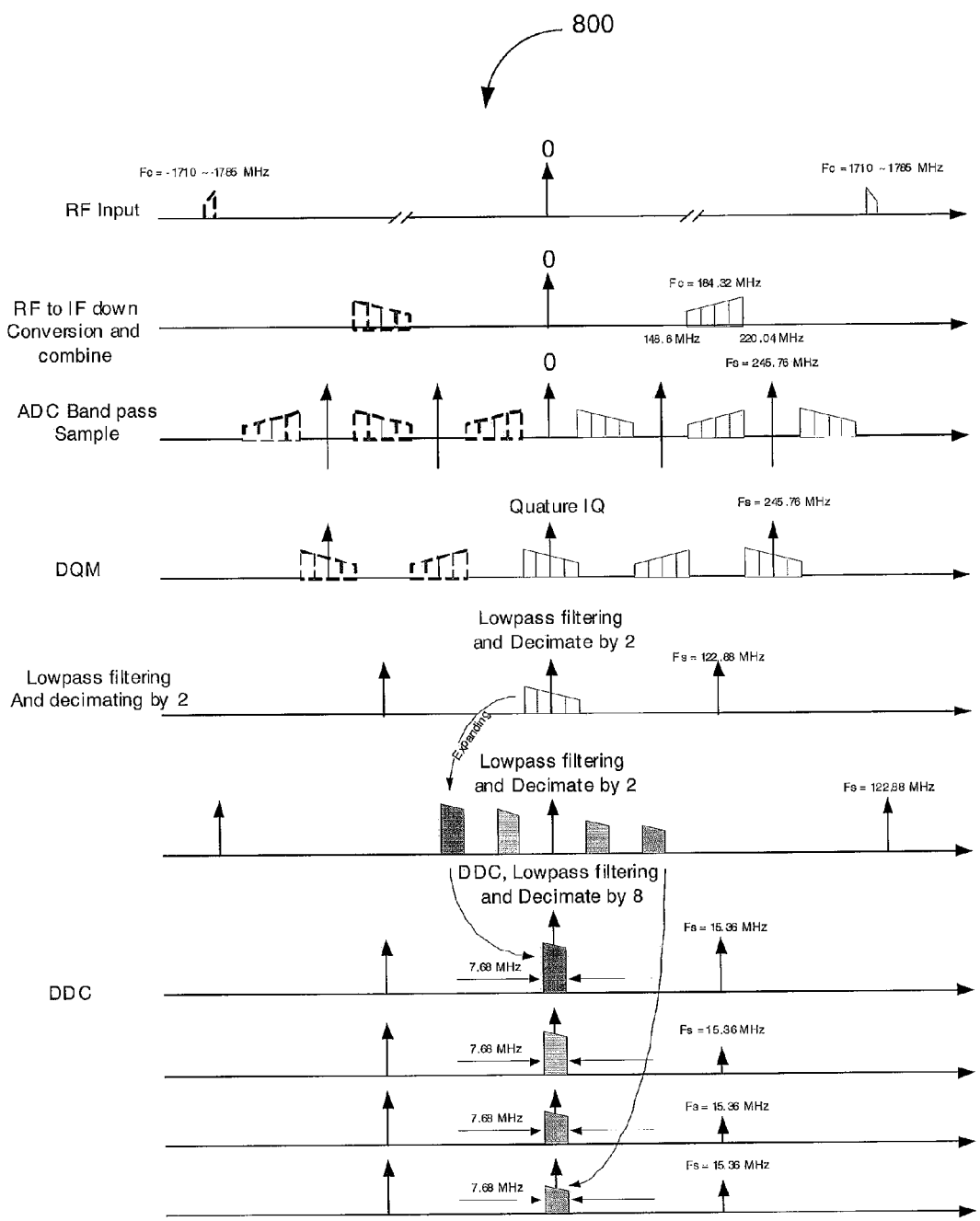
FIG. 8 illustrates a receiver frequency plan according to an embodiment of this disclosure.

FIG. 8 illustrates a receiver frequency plan 800 according to an embodiment of this disclosure.

As shown in FIGS. 6 and 7, the resulting complex digital signal is split into four paths. Each of the four paths downconverts the combined signal by a different local oscillator frequency generated by the four independent numerically controlled oscillators (NCOs) to downconvert each of the four carriers to baseband. Each of the four baseband waveforms is digitally filtered and decimated in the cascaded integrator-comb (CIC) and (finite impulse response) FIR filters to eliminate the other three carriers and any other adjacent channel noise that is present. The resulting outputs are the four independent baseband waveforms sampled at 15.36 Msps as shown in FIG. 8. These four independent waveforms were derived from the four antenna signals received on a common RF frequency. Complete orthogonality and phase relationships are maintained through the receiver and improved channel isolation is attained.

Having the four RF local oscillator frequencies, the ADC sample clock, the Hilbert Transform clock, and the digital downconverter NCO frequencies all derived from a common reference clock allows this embodiment to be viable for MIMO and beamforming applications. In this manner, the phase relationships of the antenna signals remain preserved to the complex baseband signals.

Figure 9:
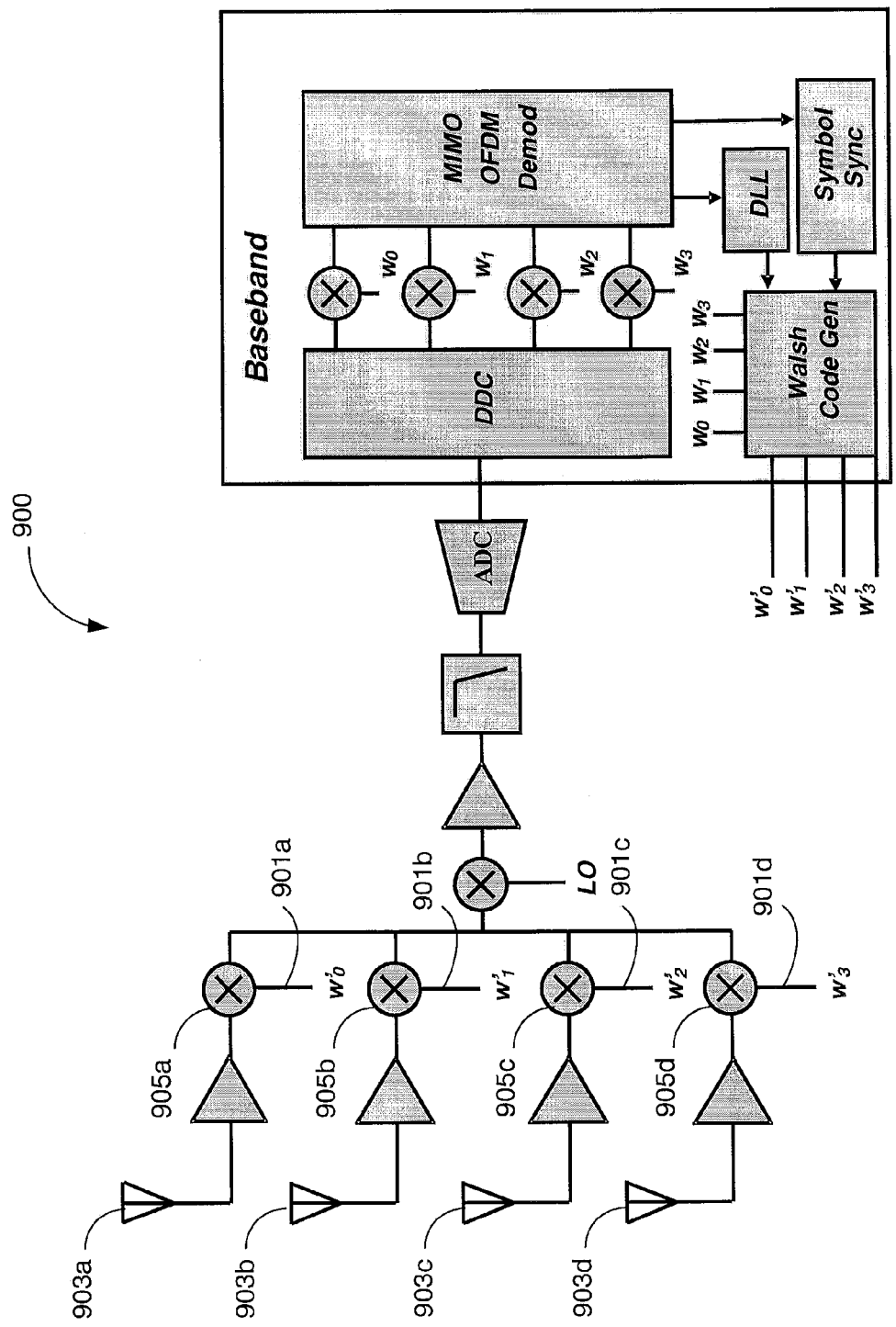
FIG. 9 illustrates a MIMO receiver architecture according to a further embodiment of this disclosure.

FIG. 9 illustrates a MIMO receiver architecture 900 according to a further embodiment of this disclosure.

In the embodiment shown in FIG. 9, orthogonal code sequences 901a, 901b, 901c, and 901d are mixed into the four MIMO receiving channels 903a, 903b, 903c, and 903d, respectively, at mixers 905a, 905b, 905c, and 905d, respectively. The four channels are then combined in the RF and downconverted. The MIMO signals are then processed in the IF and sampled by a single analog-to-digital converter (ADC). The signals are then separated in the baseband by correlating the common sampled signal with each of the four orthogonal code sequences in order to recover each individual channel. Although Walsh codes are used in this particular example, one of ordinary skill in the art would recognize that any form of orthogonal cover codes or signals may be used without departing from the scope or spirit of this disclosure.

Commercial implementation of this architecture requires modem interaction which is more complex. However, this architecture may have potential for terminal/CPE/FEMTO applications where the solutions already must be integrated as system on chips (SOCs).

It should be noted that the embodiments of this disclosure do not require direct current (DC) compensation and I/Q imbalance compensation that would be required by prior art direct downconversion architectures. Since this disclosure relates to a form of a digital IF receiver, the disclosed embodiments have ideal DC offset and I/Q balance. Therefore, it is noted that some digital signal processing (DSP) functional blocks that are required by a direct conversion receiver (i.e., DC compensation and I/Q imbalance) are not needed in the embodiments of this disclosure. Since these blocks must be repeated for each of the four receiver channels of the prior art, the power and resources required must be considered in relation to the DSP resources needed for the embodiments described herein.

Similar to conventional MIMO receivers, the conventional implementation of a MIMO transceiver (irrespective of structure) is to design a separate RF chain for each MIMO stream or path.

Figure 10:
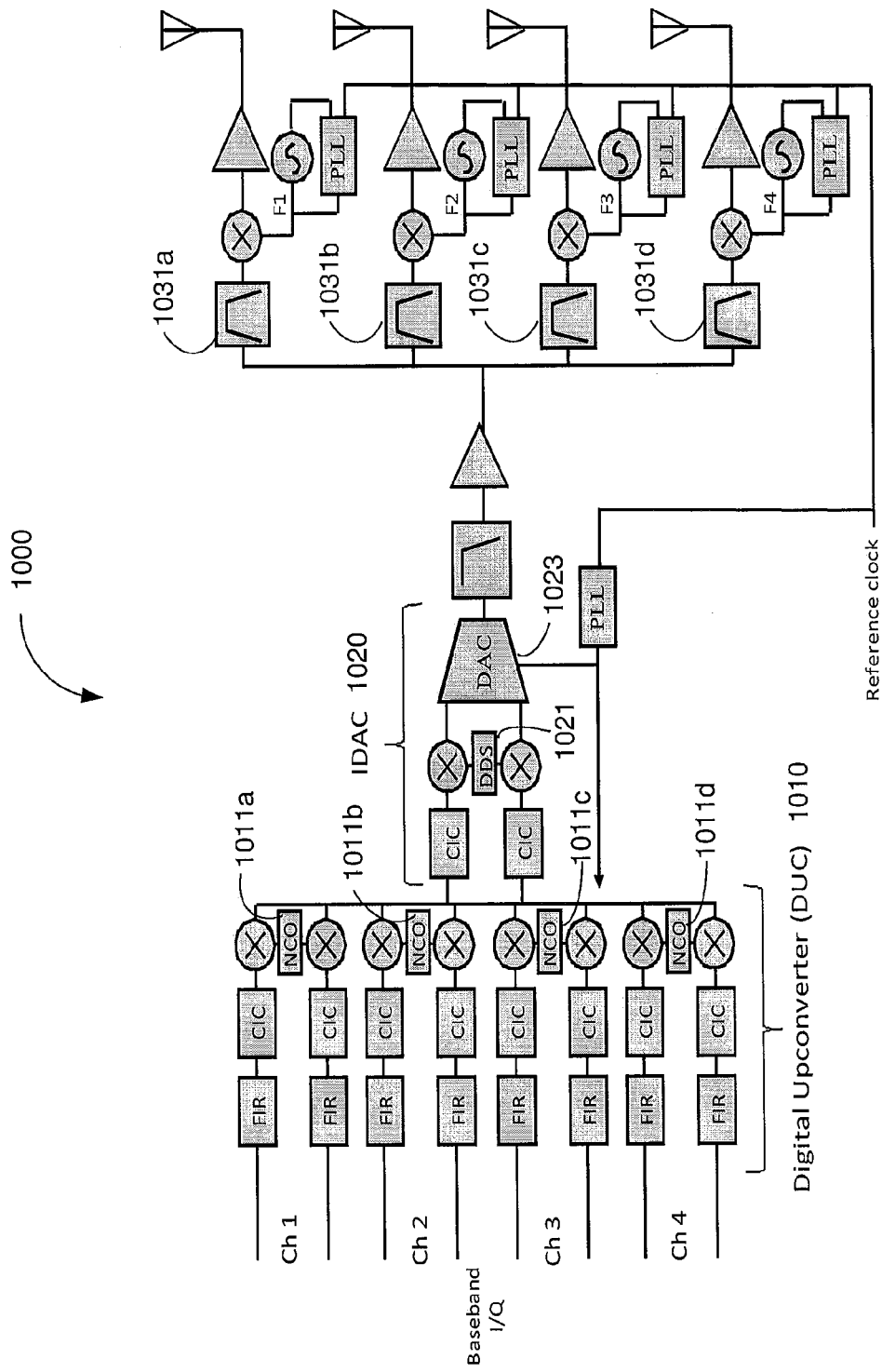
FIG. 10 illustrates a MIMO transmitter architecture according to an embodiment of this disclosure.

FIG. 10 illustrates a MIMO transmitter architecture 1000 according to an embodiment of this disclosure.

As shown in the transmitter architecture 1000, four baseband digital waveforms are modulated and upconverted to four separate intermediate frequencies (IF). Each of these four intermediate frequencies is then upconverted to a common RF using four local oscillator tones at different frequencies. The offset in the local oscillator frequencies is equal to the inverse offset in IF frequencies so that the RF signals resulting from the upconversion in each path are at a common frequency. The transmitter architecture 1000 utilizes a digital IF approach that accepts four separate complex baseband digital waveforms.

For example, the waveforms may be sampled at 15.36 Msps. These four TX waveforms are digitally interpolated and modulated in a digital upconverter (DUC) 1010 onto four offset digital IF carrier frequencies of, for example, −37.5, −12.5, +12.5, and +37.5 MHz using oscillators 1011a, 1011b, 1011c and 1011d. These digitally modulated carriers are then combined into a single complex digital signal to the output of the DUC 1010.

The output of the DUC 1010 is further interpolated by an interpolating digital-to-analog converter (IDAC) 1020, digitally upconverted using a direct digital synthesizer (DDS) 1021, and then sampled to an output of a digital-to-analog converter (DAC) 1023 at the interpolated rate. In this particular example, the baseband waveforms are interpolated to 122.88 Msps at the output of the DUC 1010, and the IDAC 1020 further interpolates the baseband waveforms to 983.04 Msps. The DDS 1021 in the IDAC 1020 generates a 245.76 MHz tone, and a quadrature modulator modulates the baseband waveforms onto this 245.76 MHz carrier. The resulting output from the IDAC 1020 is a signal containing the four modulated carriers at four different IF frequencies located between 200 and 300 MHz. Although not shown in the IDAC 1020, in particular embodiments, there exists a sinc compensation block that equalizes the zero-order hold response of the DAC 1023 so that all four carriers would be generated with roughly equal gain relative to the baseband amplitude.

The combined IF signal is filtered, amplified, and finally split to four branches. Each of the four branches contains a bandpass filter 1031a, 1031b, 1031c or 1031d that passes only one of the four carriers. Each filtered carrier is then upconverted using a unique local oscillator (LO) frequency from a local oscillator 1033a, 1033b, 1033c or 1033d to upconvert the IF signal to a common RF frequency. The four local oscillators are phase locked to a common reference frequency as the DUC 1010 and IDAC 1020 sample clocks, therefore, maintaining full phase coherency on the upconverted RF carriers. Each of the four RF signals is amplified by a power amplifier and provided to an antenna for transmission.

Figure 11:
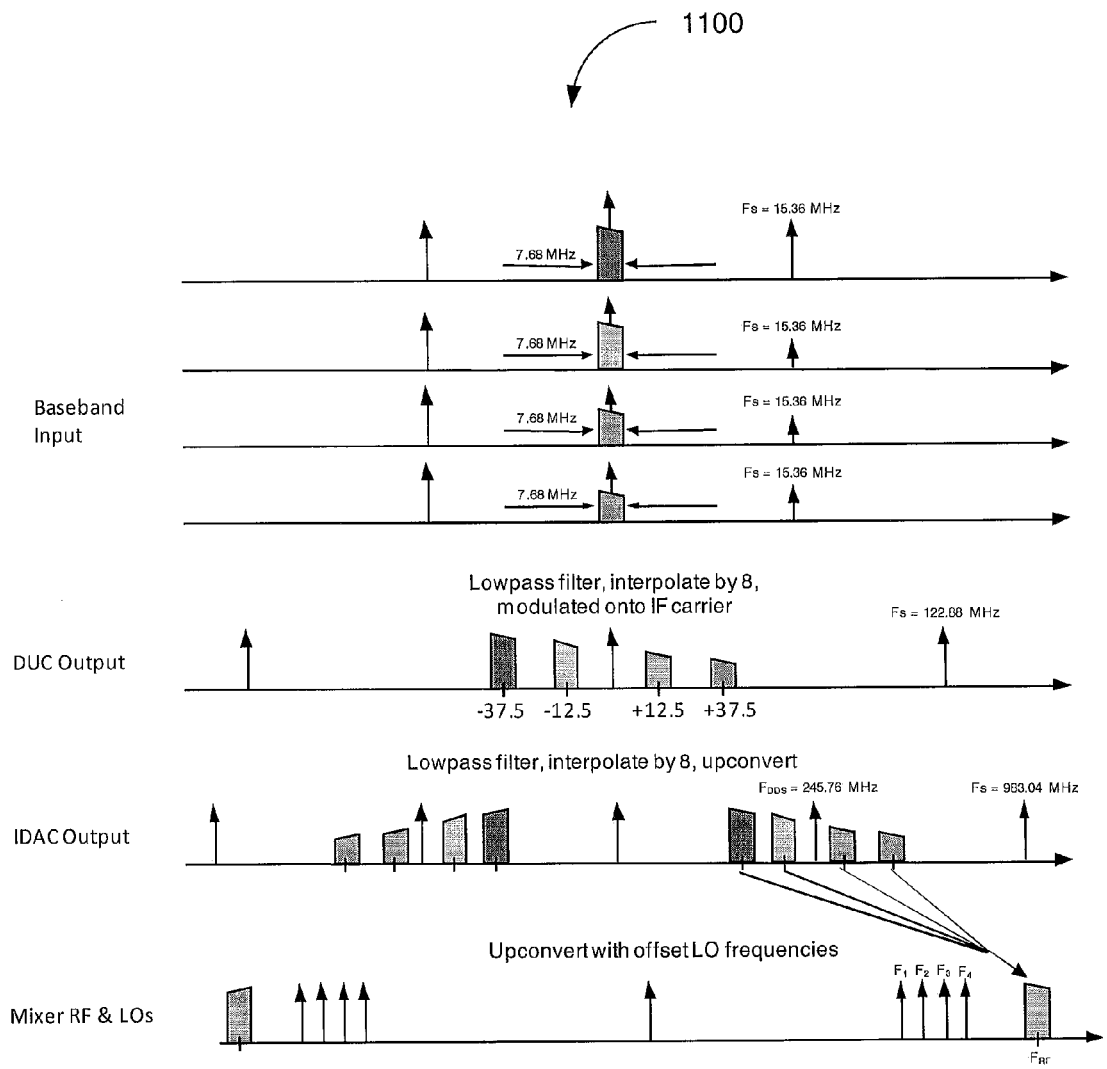
FIG. 11 illustrates a transmitter frequency plan according to an embodiment of this disclosure.

FIG. 11 illustrates a transmitter frequency plan 1100 according to an embodiment of this disclosure.

FIG. 11 shows the output spectrum of the DUC 1010.

The frequencies used in this disclosure are for example only. One of ordinary skill in the art would recognize that various combinations of sample rates, interpolation rates, DUC NCO frequencies, DDS frequencies, DAC sample rates, and local frequencies could be used to accomplish the same upconversion.

Although the above embodiments are described in relation to signals from four receiving or transmitting antennas for ease of description, one of ordinary skill in the art would recognize that the teachings of this disclosure can be implemented for any number of receiving antennas, such as eight receive antennas, without departing from the scope or spirit of this disclosure.

Because the simplified receiver and transmitter architectures of this disclosure maintain complete path orthogonality and phase coherency while maintaining excellent signal EVM (error vector magnitude), these architectures can be applied to MIMO receivers and transmitters, beamforming receivers and transmitters, and diversity receivers and transmitters.

The architectural concepts of this disclosure can be applied to both terminal and infrastructure wireless equipment. Wireless handsets requiring MIMO and/or beamforming receivers and transmitters containing multiple receiver paths benefit from the size, cost, and power reductions realized by such a simplified architecture. Likewise, since the architectures fully support the EVM and other tight performance requirements of infrastructure equipment, base station platforms would also benefit through a reduction in size, cost, and power consumption without any compromise in performance.

Figure 12:
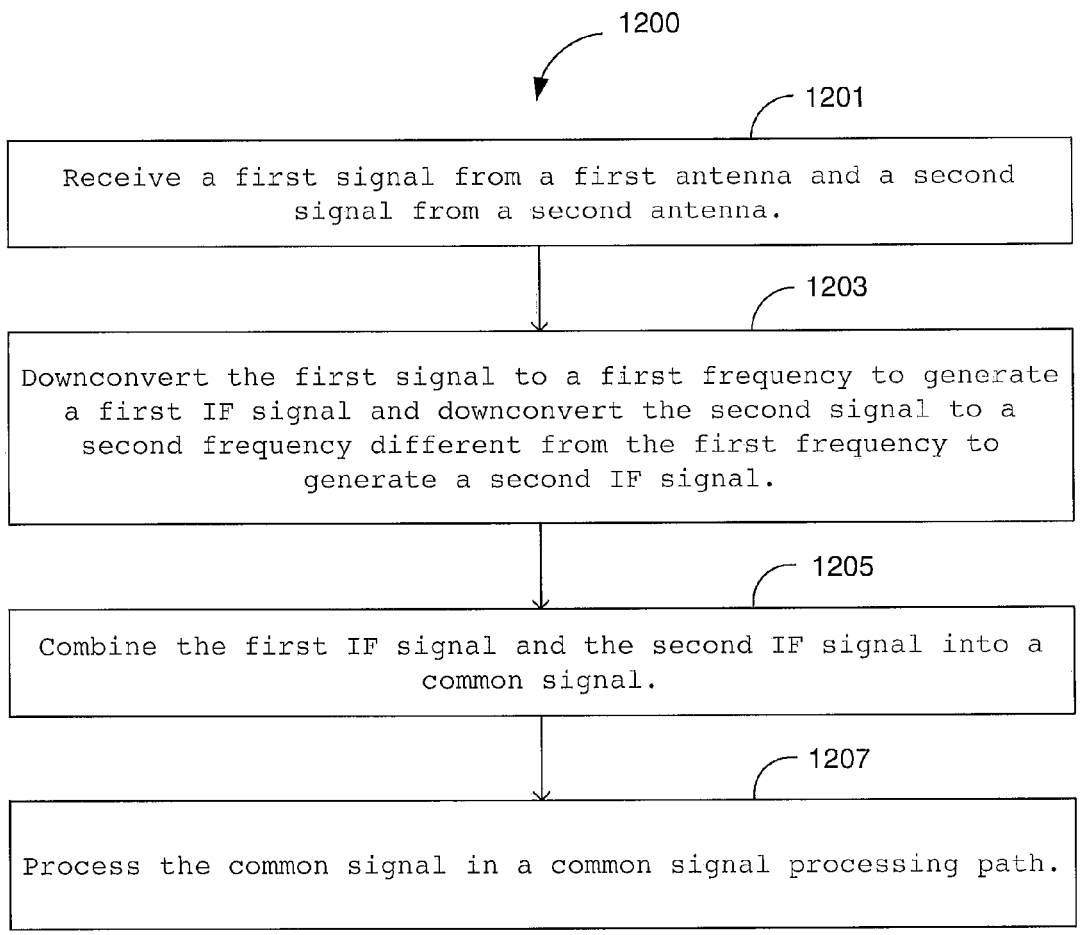
FIG. 12 illustrates a method of operating a MIMO receiver according to an embodiment of this disclosure.

FIG. 12 illustrates a method 1200 of operating a MIMO receiver according to an embodiment of this disclosure.

As shown in FIG. 12, method 1200 comprises receiving a first signal from a first antenna and a second signal from a second antenna (block 1201). Method 1200 also comprises downconverting the first signal to a first frequency to generate a first IF signal and downconverting the second signal to a second frequency different from the first frequency to generate a second IF signal (block 1203). Method 1200 further comprises combining the first IF signal and the second IF signal into a common signal (block 1205), and processing the common signal in a common signal processing path (block 1207).

Figure 13:
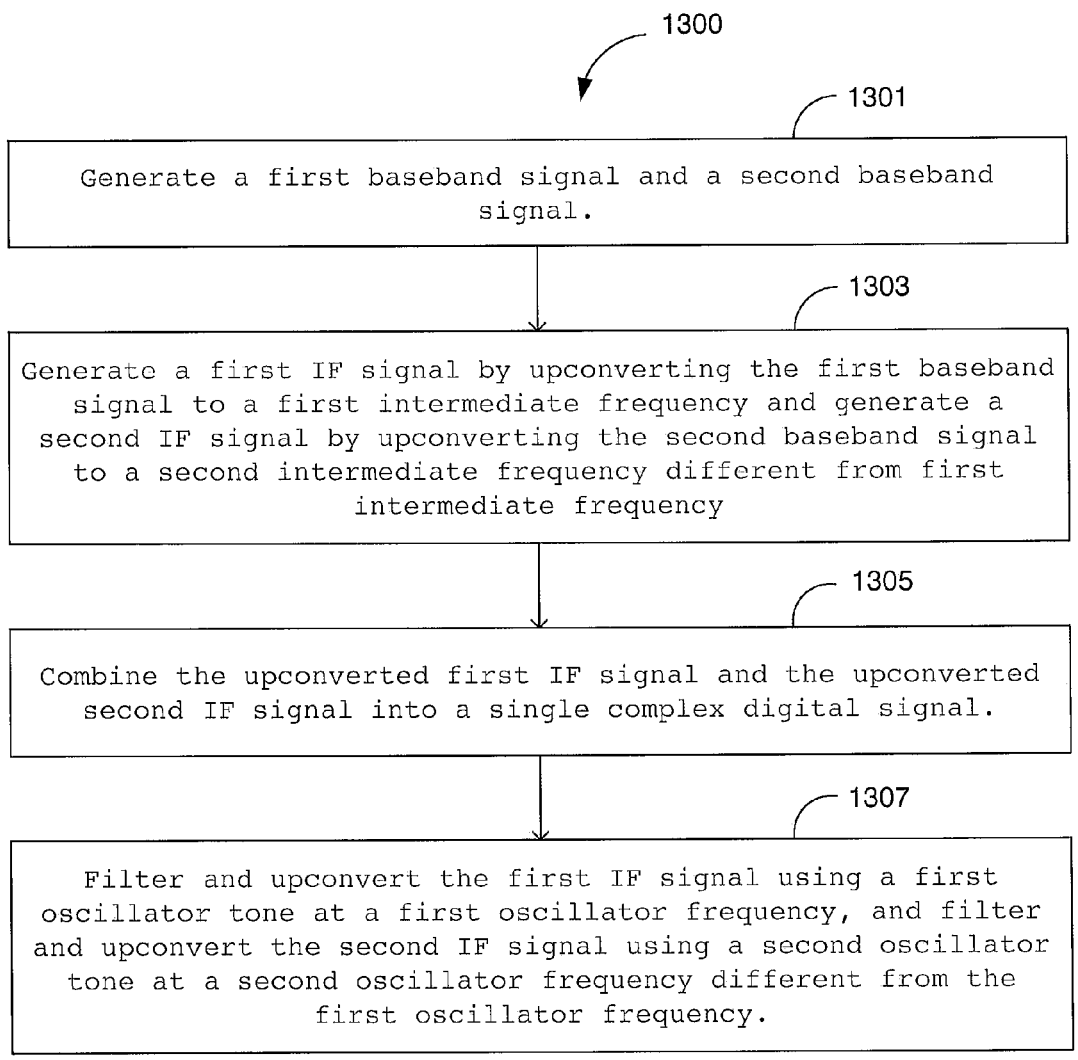
FIG. 13 illustrates a method of operating a MIMO transmitter according to an embodiment of this disclosure.

FIG. 13 illustrates a method 1300 of operating a MIMO transmitter according to an embodiment of this disclosure.

As shown in FIG. 13, method 1300 comprises generating a first baseband signal and a second baseband signal (block 1301). Method 1300 also comprises generating a first IF signal by upconverting the first baseband signal to a first intermediate frequency and generating a second IF signal by upconverting the second baseband signal to a second intermediate frequency different from first intermediate frequency (block 1303). Method 1300 yet further comprises combining the upconverted first IF signal and the upconverted second IF signal into a single complex digital signal (block 1305). Method 1300 further comprises filtering and upconverting the first IF signal using a first oscillator tone at a first oscillator frequency, and filtering and upconverting the second IF signal using a second oscillator tone at a second oscillator frequency different from the first oscillator frequency (block 1307).

Figure 14:
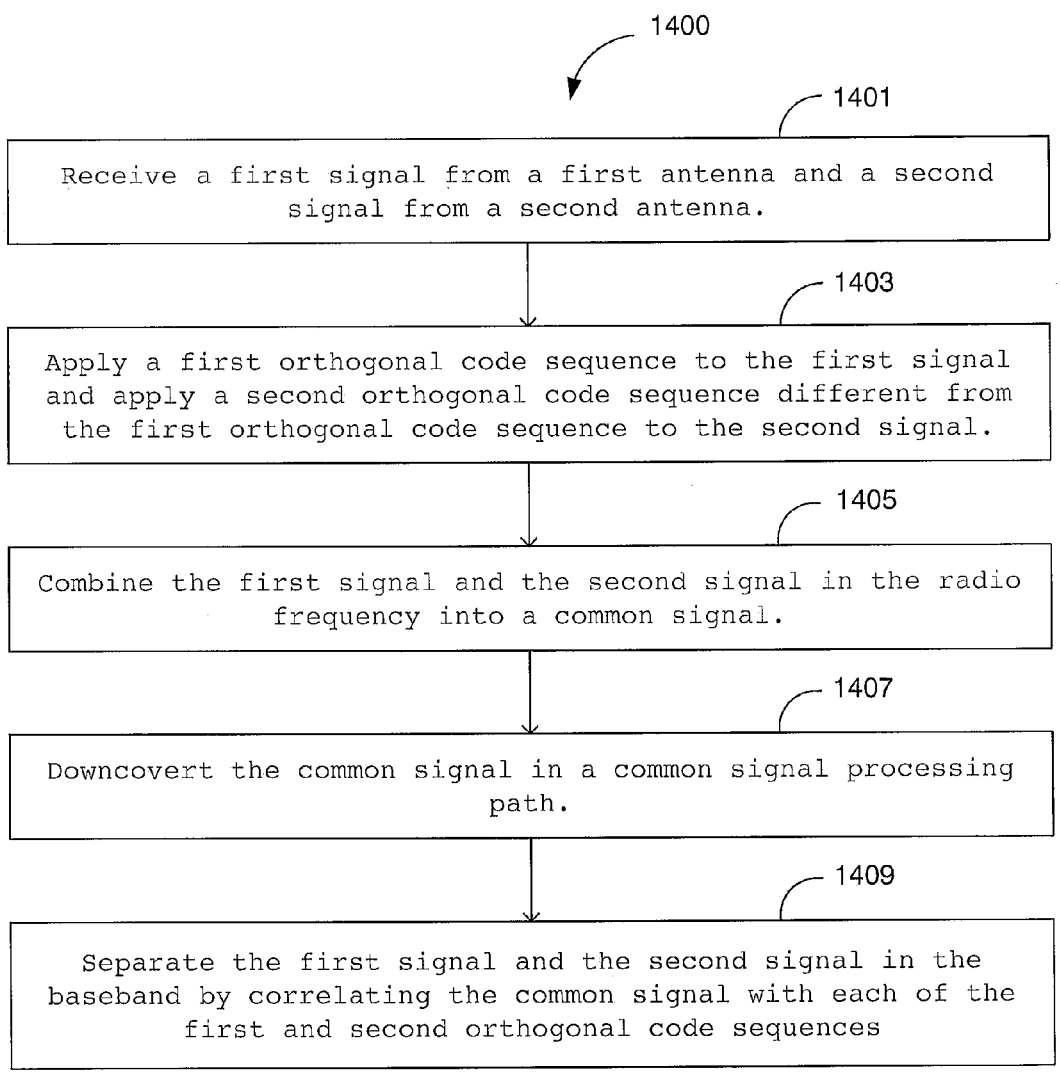
FIG. 14 illustrates a method of operating a MIMO receiver according to another embodiment of this disclosure.

FIG. 14 illustrates a method 1400 of operating a MIMO receiver according to another embodiment of this disclosure.

As shown in FIG. 14, method 1400 comprises receiving a first signal from a first antenna and a second signal from a second antenna (block 1401). Method 1400 also comprises applying a first orthogonal code sequence to the first signal and applying a second orthogonal code sequence different from the first orthogonal code sequence to the second signal (block 1403). Method 1400 further comprises combining the first signal and the second signal in the radio frequency into a common signal (block 1405), and downcoverting the common signal in a common signal processing path (block 1407). Method 1400 further comprises separating the first signal and the second signal in the baseband by correlating the common signal with each of the first and second orthogonal code sequences (block 1409).

For ease and clarity in the description, the embodiments of this disclosure have been described in terms of OFDM applications. However, one of ordinary skill in the art would recognize that the teachings of disclosure may be applied to any multi-antenna communications system without departing from the scope or spirit of this disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multiple-input multiple-output (MIMO) receiver comprising:
 a receive path circuitry configured to:
   receive a first signal from a first antenna and a second signal from a second antenna;
   downconvert the first signal to a first frequency to generate a first intermediate frequency (IF) signal, the first intermediate frequency signal phase locked to a reference signal;
   downconvert the second signal to a second frequency different from the first frequency to generate a second IF signal, the second intermediate frequency signal phase locked to the reference signal; and
   combine the first IF signal and the second IF signal into a common signal.

2. The receiver in accordance with claim 1, wherein the receive path circuitry is further configured to:
 processing the common signal in a common signal processing path.

3. The receiver in accordance with claim 1, wherein the first frequency is generated at a first local oscillator, and the second frequency is generated at a second local oscillator.

4. The receiver in accordance with claim 1, wherein the first frequency is generated by mixing a common local oscillator frequency with a first offset frequency, and the second frequency is generated by mixing the common local oscillator frequency with a second offset frequency different from the first offset frequency.

5. A method of operating a multiple-input multiple-output (MIMO) receiver, the method comprising:
 receiving a first signal from a first antenna and a second signal from a second antenna;
 downconverting the first signal to a first frequency to generate a first intermediate frequency (IF) signal, the first IF signal phase locked to a reference signal;
 downconverting the second signal to a second frequency different from the first frequency to generate a second IF signal, the second IF signal phase locked to the reference signal; and
 combining the first IF signal and the second IF signal into a common signal.

6. The method in accordance with claim 5, further comprising:
 processing the common signal in a common signal processing path.

7. The method in accordance with claim 5, wherein the first frequency is generated at a first local oscillator, and the second frequency is generated at a second local oscillator.

8. The method in accordance with claim 5, wherein the first frequency is generated by mixing a common local oscillator frequency with a first offset frequency, and the second frequency is generated by mixing the common local oscillator frequency with a second offset frequency different from the first offset frequency.

9. A multiple-input multiple-output (MIMO) transmitter comprising:
 a transmit path circuitry configured to:
   generate a first baseband signal and a second baseband signal;
   generate a first intermediate frequency (IF) signal by upconverting the first baseband signal to a first intermediate frequency;
   generate a second IF signal by upconverting the second baseband signal to a second intermediate frequency different from first intermediate frequency;
   upconvert the first IF signal using a first oscillator tone at a first oscillator frequency;
   upconvert the second IF signal using a second oscillator tone at a second oscillator frequency different from the first oscillator frequency;
   combine the upconverted first IF signal and the upconverted second IF signal into a single complex digital signal; and
   interpolate the single complex digital signal into a signal containing the upconverted first IF signal and the upconverted second IF signal, each upconverted IF signal modulated at different intermediate frequencies.

10. The transmitter in accordance with claim 9, wherein the transmit path circuitry is further configured to:
 split the single complex digital signal to a first transmission path and a second transmission path.

11. The transmitter in accordance with claim 9, wherein an offset in the first and second oscillator frequencies is equal to an inverse of an offset in the first and second intermediate frequencies.

12. The transmitter in accordance with claim 9, wherein the first oscillator frequency and the second oscillator frequency are phase locked to a reference frequency.

13. The transmitter in accordance with claim 9, wherein the transmit path circuitry is further configured to:
 split the single complex digital signal into the upconverted first IF signal at a first carrier frequency, and the upconverted second IF signal at a second carrier frequency.

14. A multiple-input multiple-output (MIMO) transmitter comprising:
 a transmit path circuitry configured to:
  generate a first baseband signal and a second baseband signal;
  generate a first intermediate frequency (IF) signal by upconverting the first baseband signal to a first intermediate frequency;
  generate a second IF signal by upconverting the second baseband signal to a second intermediate frequency different from first intermediate frequency;
  upconvert the first IF signal using a first oscillator tone at a first oscillator frequency;
  upconvert the second IF signal using a second oscillator tone at a second oscillator frequency different from the first oscillator frequency;
  combine the upconverted first IF signal and the upconverted second IF signal into a single complex digital signal, and
  split the single complex digital signal to a first transmission path and a second transmission path, wherein the first transmission path passes only the upconverted first IF signal at a first carrier frequency and the second transmission path passes only the upconverted second IF signal at a second carrier frequency.

15. A method of operating a multiple-input multiple-output (MIMO) transmitter, the method comprising:
 generating a first baseband signal and a second baseband signal;
 generating a first intermediate frequency (IF) signal by upconverting the first baseband signal to a first intermediate frequency;
 generating a second IF signal by upconverting the second baseband signal to a second intermediate frequency different from first intermediate frequency;
 upconverting the first IF signal using a first oscillator tone at a first oscillator frequency;
 upconverting the second IF signal using a second oscillator tone at a second oscillator frequency different from the first oscillator frequency; and
 combining the upconverted first IF signal and the upconverted second IF signal into a single complex digital signal; and
 interpolating the single complex digital signal into a signal containing the upconverted first IF signal and the upconverted second IF signal, each upconverted IF signal modulated at different intermediate frequencies.

16. The method in accordance with claim 15, further comprising:
 splitting the single complex digital signal to a first transmission path and a second transmission path.

17. The method in accordance with claim 15, wherein an offset in the first and second oscillator frequencies is equal to an inverse of an offset in the first and second intermediate frequencies.

18. The method in accordance with claim 15, wherein the first oscillator frequency and the second oscillator frequency are phase locked to a reference frequency.

19. The method in accordance with claim 15, further comprising:
 splitting the single complex digital signal to into the upconverted first IF signal at a first carrier frequency, and the upconverted second IF signal at a second carrier frequency.

20. A method of operating a multiple-input multiple-output (MIMO) transmitter, the method comprising:
 generating a first baseband signal and a second baseband signal;
 generating a first intermediate frequency (IF) signal by upconverting the first baseband signal to a first intermediate frequency;
 generating a second IF signal by upconverting the second baseband signal to a second intermediate frequency different from first intermediate frequency;
 upconverting the first IF signal using a first oscillator tone at a first oscillator frequency;
 upconverting the second IF signal using a second oscillator tone at a second oscillator frequency different from the first oscillator frequency;
 combining the upconverted first IF signal and the upconverted second IF signal into a single complex digital signal; and
 splitting the single complex digital signal to a first transmission path and a second transmission path,
 wherein the first transmission path passes only the upconverted first IF signal at a first carrier frequency and the second transmission path passes only the upconverted second IF signal at a second carrier frequency.

* * * * *